United States Patent [19]

Johnson

[11] 4,188,012
[45] Feb. 12, 1980

[54] BUTTERFLY VALVE CONSTRUCTION

[75] Inventor: Jesse R. Johnson, Collins, N.Y.

[73] Assignees: Coyle E. Knowles, Las Vegas, Nev.; a part interest to each; Eugene L. Fisher, Gowanda, N.Y.; a part interest to each

[21] Appl. No.: 842,451

[22] Filed: Oct. 17, 1977

[51] Int. Cl.² .............................................. F16K 25/00
[52] U.S. Cl. ..................................... 251/173; 251/308
[58] Field of Search ............................ 251/5, 173, 308

[56] References Cited

U.S. PATENT DOCUMENTS

| | | | |
|---|---|---|---|
| 1,834,870 | 12/1931 | Rogers | 251/173 |
| 2,529,572 | 11/1950 | Raybould | 251/308 |
| 3,216,695 | 11/1965 | Bartholet | 251/173 |
| 3,471,121 | 10/1969 | Geiselman | 251/308 |
| 3,734,457 | 5/1973 | Roos | 251/173 |
| 4,026,514 | 5/1977 | Summer | 251/173 |

Primary Examiner—Harold W. Weakley
Attorney, Agent, or Firm—Joseph P. Gastel

[57] ABSTRACT

A valve comprising a substantially cylindrical housing, a substantially annular cylindrical resilient valve seating member in said housing, said seating member having an inner surface and an outer surface, a butterfly valve having an outer periphery, a shaft extending through the housing and the seating member for mounting the butterfly valve for movement between a first position wherein its outer periphery is in engagement with the inner surface of the seating member and an open position wherein the outer periphery of the butterfly valve is spaced from the inner surface, a plurality of ribs on the outer surface of the valve seating member for bearing against the inner surface of the housing, chambers between the ribs, a plurality of openings in the valve seating member upstream of the butterfly valve for permitting pressurized fluid to enter the chambers to thereby tend to move the resilient valve seating member radially inwardly into engagement with the outer periphery of the butterfly valve when the latter is in a closed position, said ribs limiting said seating member from expanding outwardly.

9 Claims, 10 Drawing Figures

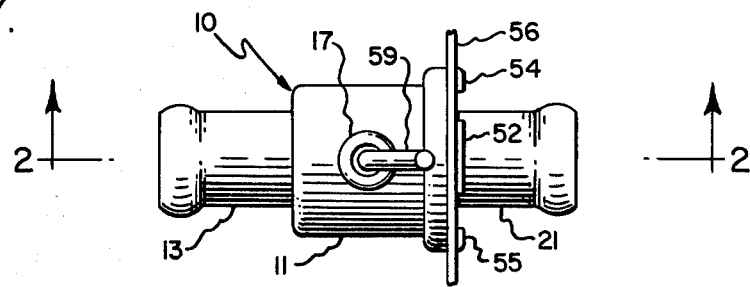
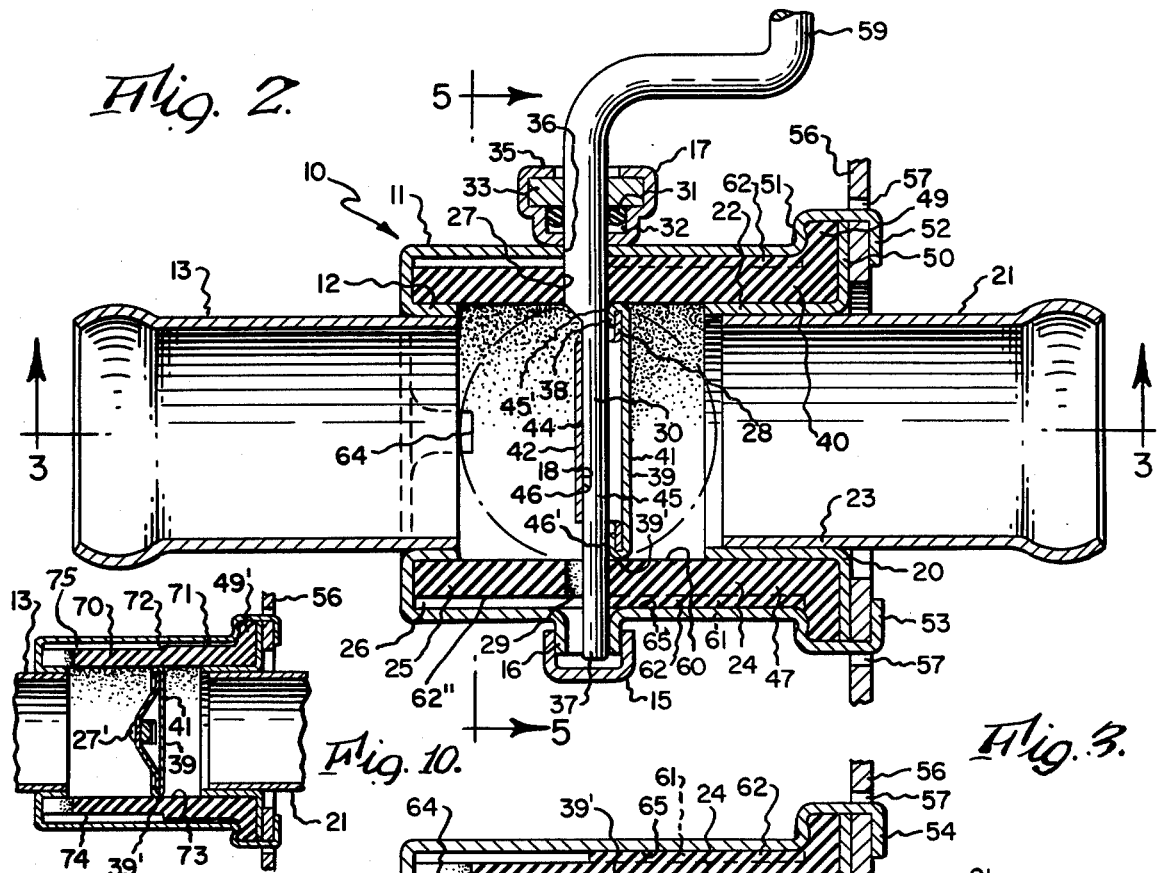
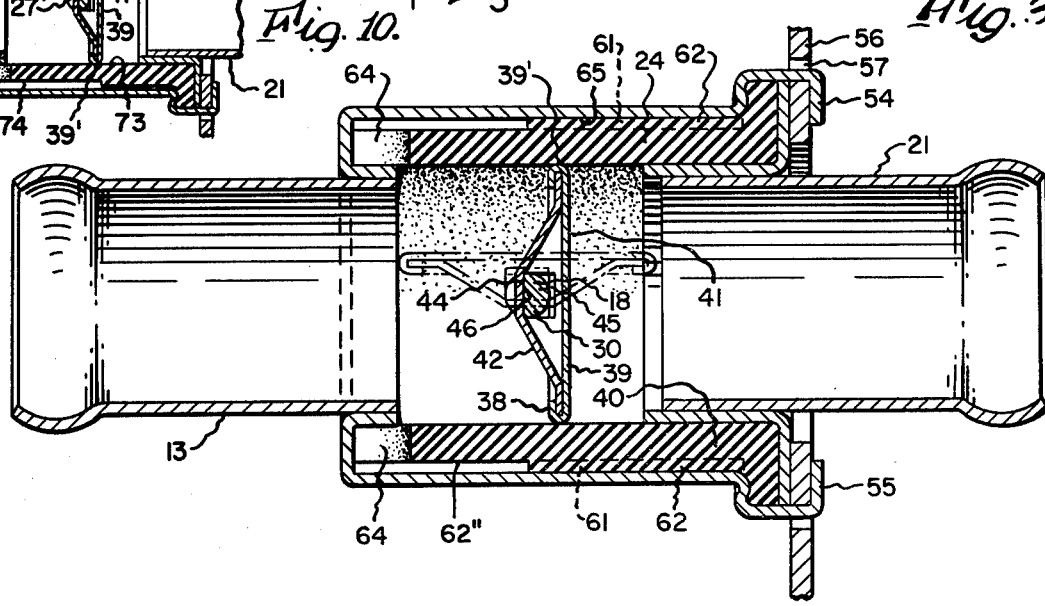

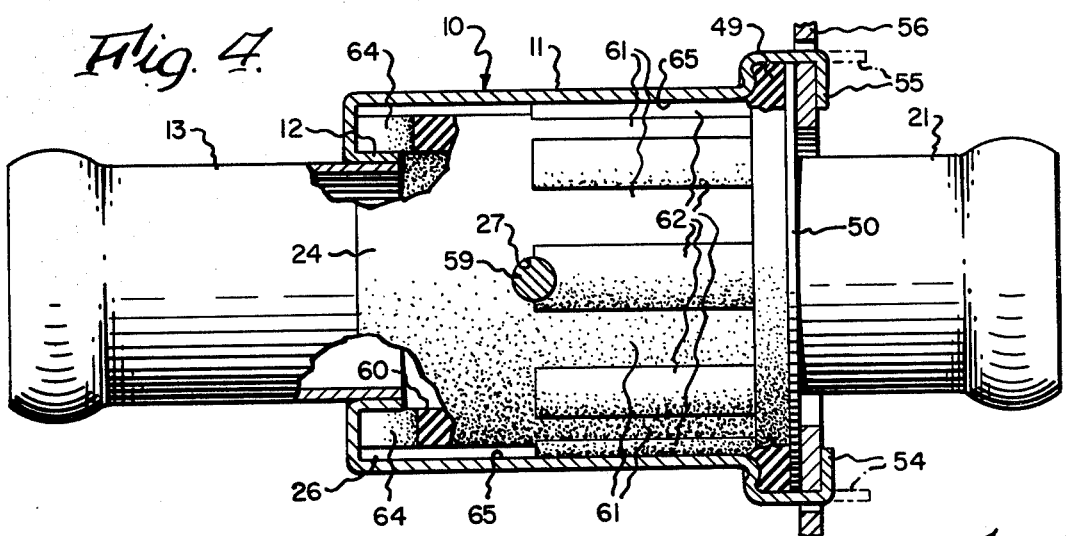
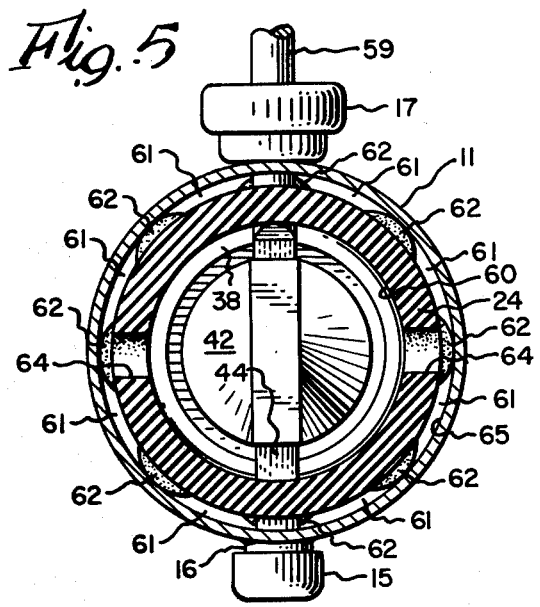
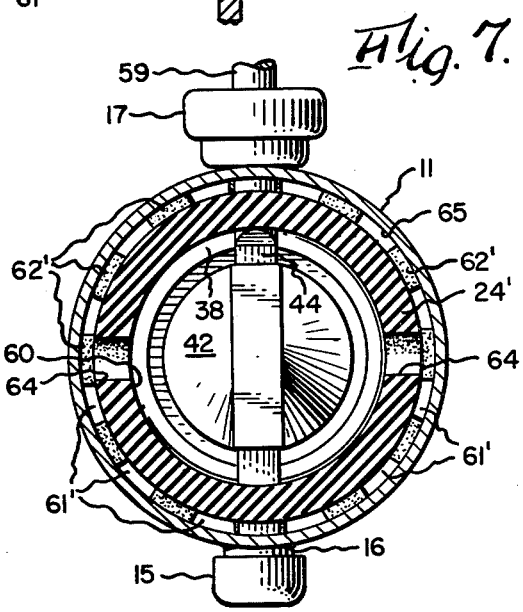
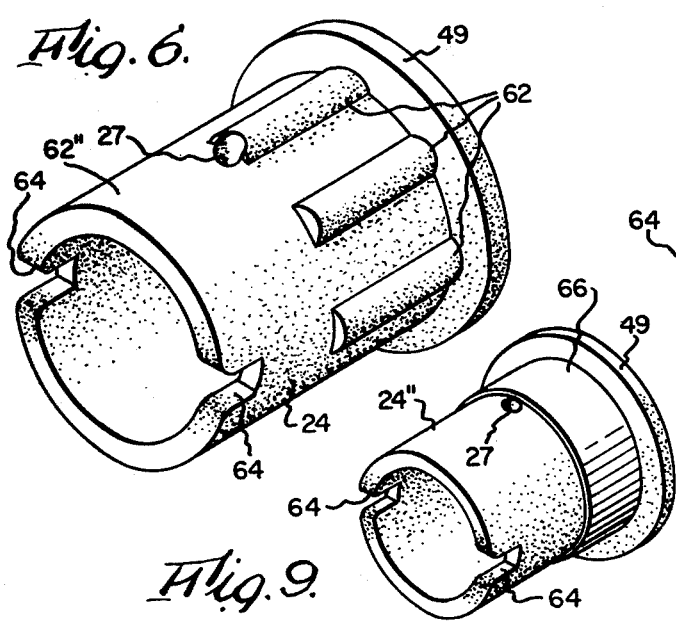
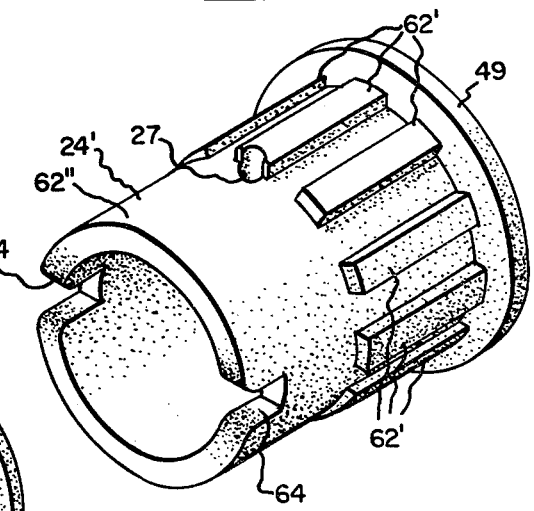

BUTTERFLY VALVE CONSTRUCTION

CROSS REFERENCE TO RELATED APPLICATION

The present invention is an improvement over the subject matter of my copending application Ser. No. 775,517, filed Mar. 8, 1977, now U.S. Pat. No. 4,133,512, dated Jan. 9, 1979, in that it contains structure for positively preventing leakage at low pressures.

BACKGROUND OF THE INVENTION

The present invention relates to an improved butterfly valve construction.

By way of background, while there have been teachings in the past of the use of fluid pressure to aid in valve seating, such as shown in prior U.S. Pat. No. 2,973,181, issued to J. R. Johnson and U.S. Pat. No. Re. 24,102, the valves of such patents were of entirely different construction and mode of operation in that they were not butterfly valves such as shown in the present invention. Furthermore, in copending application Ser. No. 775,517, now U.S. Pat. No. 4,133,512, dated Jan. 9, 1979, slight expansion of the seating member could occur at low pressures, and this could result in undesirable leakage. The present invention is concerned with preventing such undesirable expansion of the seating member.

SUMMARY OF THE INVENTION

It is accordingly one advantage of the present invention that the improved butterfly valve will provide good seating at all pressures, including low pressures, throughout the life of the valve because of an unique construction contained therein.

It is another advantage of the present invention that the improved butterfly valve can be fabricated out of relatively low cost drawn parts and still provide good seating at all pressures, including low pressures, because of the unique seating arrangement contained therein. Other advantages of the present invention will readily be perceived hereafter.

The present invention relates to a valve construction comprising a housing, a butterfly valve in said housing, a peripheral portion on said butterfly valve, a seating member on the inside of said housing for seating engagement by said peripheral portion, means for biasing said seating member toward said peripheral portion when said peripheral portion is in engagement therewith, and means for limiting outward movement of said seating member. In accordance with a preferred embodiment of the present invention, the means for biasing the seating member toward the peripheral portion comprises areas on the outside of said seating member for receiving pressurized fluid for causing the seating surface to be biased toward the peripheral portion of the butterfly valve to effect seating engagement therewith, and the means for limiting outward movement of said seating surface comprises a plurality of ribs on the outside of the seating member. The various aspects of the present invention will be more fully understood when the following portions of the specification are read in conjunction with the accompanying drawings wherein:

BRIEF DESCRIPTION OF THE DRAWINGS

FIG. 1 is a plan view of the improved valve of the present invention;

FIG. 2 is a fragmentary cross sectional view taken substantially along line 2—2 of FIG. 1;

FIG. 3 is a fragmentary cross sectional view taken substantially along line 3—3 of FIG. 2 and showing the butterfly valve in both an open and a closed position;

FIG. 4 is a view similar to FIG. 3 with parts of the housing broken away to reveal the outer surface of the seating member;

FIG. 5 is a fragmentary cross sectional view taken substantially along line 5—5 of FIG. 2 and showing the valve in a closed position;

FIG. 6 is a perspective view of the valve seating member;

FIG. 7 is a view similar to FIG. 5 but showing a modified form of valve seating member;

FIG. 8 is a perspective view of the valve seating member of FIG. 7;

FIG. 9 is a perspective view of a modified form of valve seating member; and

FIG. 10 is a cross sectional view of a still further modified form of the present invention.

DESCRIPTION OF THE PREFERRED EMBODIMENTS

The improved valve 10 includes a generally cylindrical central housing portion 11 having an inwardly bent annular flange 12 to which inlet conduit 13 is copper-brazed in fluid-tight relationship. A cylindrical bearing cap 15 is mounted on the annular flange 16 extending from central housing 11, and the joint therebetween is copper-brazed. A cylindrical shaft-seal housing 17 is brazed to central housing portion 11. After the foregoing subassembly consisting of parts 11, 13, 15 and 17 have been fabricated, they are zinc plated, or otherwise coated for corrosion resistance, as desired.

A second subassembly consisting of annular housing member 20 and outlet conduit 21 is also provided. The cylindrical portion 22 of housing member 20 has portion 23 of conduit 21 copper-brazed thereto. After the foregoing subassembly has been fabricated, it is zinc plated.

A seating member 24 is formed from a flexible tubular conduit which is fabricated of rubber or other flexible resilient material and is inserted within housing 11. The inlet end portion 25 of member 24 receives the annular flange 12 of housing 11 and is contained within the annular trough 26 at the left end of housing 11. Seating member 24 includes first and second apertures 27 and 29 which receive shaft 30. In this respect, an O-ring 31 is placed in recess 32 of bearing housing 17 and a washer 33 is inserted thereover, after which flange 35 is formed by swaging to retain the parts assembled. Thereafter, shaft 30 is threaded through washer 33, O-ring 31, aperture 36 in housing 11, aperture 27, aperture 29, and the end 37 of shaft 30 is received in annular flange 16.

Prior to positioning shaft 30 in the foregoing manner, butterfly valve 39, which is a disc, is positioned within seating member 24 to receive shaft 30 with an interference fit. In this respect, butterfly valve 39 is inserted through the outlet end 40 of seating member 24, inasmuch as at this time, the subassembly consisting of parts 20 and 21 have not yet been mounted on the central housing portion 11. Disc or butterfly member 39 is of generally circular shape, and it is formed of a circular face member 41 and an annular backing member 42 which are assembled by swaging the annular rim 38 of face member 41 over the annular edge portion 28 of backing member 42. An elongated opening 18 is formed in the backing member 42, and the flat 44 on reduced shaft portion 45 bears against the flat 46 of back portion 42. The interference fit is between surface 46 and the portions of rim 38 which contact the shaft 30 at areas 45' and 46'. Shaft 30, after having been threaded through washer 33, O-ring 31 and apertures 36 and 27, is threaded through the opening 18 between backing member 42 and face member 41.

After disc 39 has been assembled on shaft 30, the subassembly consisting of parts 20 and 21 are secured to valve housing 11. In this respect, cylindrical portion 22 of member 20 is inserted into end portion 47 of seating member 24. After member 20 has been positioned as shown in FIG. 2, with annular flange 49 of member 24 compressed in fluid-tight relationship between annular rim 50 of part 20 and annular shoulder 51 of housing 11, four tabs 52, 53, 54 and 55, which are extensions of central housing 11 and which previously occupied a dotted line position, such as shown in FIG. 4, are bent to the solid line position shown in FIGS. 2 and 4 to hold housing portion 20 in fluid-tight relationship relative to central housing portion 11 with flange 49 therebetween. However, prior to the time that tabs 52, 53, 54 and 55 are bent, a mounting plate 56 is positioned as shown in FIG. 2 and the tabs extend through suitable apertures such as 57 in the mounting plate. The mounting plate 56 is for the purpose of mounting a fluid motor or the like, the output shaft of which is suitably connected to the external portion 59 of shaft 30 for actuating the latter.

In use, liquid under pressure enters inlet conduit 13. When the butterfly or disc 39 is in an open position, as shown in dotted lines in FIG. 3, liquid will flow through the valve and out through outlet conduit 21. There will be no leakage because of the various copper brazed joints and seals at the appropriate places, as described in detail above. When it is desired to close the valve, shaft 30 is rotated to cause disc 39 to assume the solid line positions shown in FIGS. 2 and 3. Under such circumstances the outer periphery 39' of disc 39 will be in engagement with the inner surface 60 of seating member 24. Pressurized liquid in inlet conduit 13 and in seating member 24 upstream of disc 39 will enter chambers 61 (FIGS. 4 and 5) which are formed between the inner surface 65 of central housing 11 and the ribs 62 formed on the outer surface of seating member 24. The pressurized fluid enters chambers 61 through the two slots 64 in seating member 24 and is retained therein because the flange 49 of the seating member is mounted in fluid-tight relationship in housing 11. The presssurized liquid in chambers 61 biases flexible resilient seating member 24 radially inwardly to the right of disc 39 because the inner surface 60 to the right of disc 39 is a lower pressure area than chambers 61. The inward movement of seating member 24 will thus provide a good seal with the outer peripheral portion of disc 39 to prevent leakage, even though the member 24 might be worn from use or might not otherwise mate perfectly with the periphery of disc 39 in its unbiased condition.

The ribs 62 are provided in accordance with the present invention to support the seating member 24 against outward radial movement so that the disc 39 will seat firmly at low pressures. In this respect, ribs 62 extend outwardly from the outer surface 62" of seating member 24, and the outer radial portions of ribs 62 rest against the inner circumferential surface 65 of housing 11. As can be seen from FIGS. 5 and 6, ribs 62 are segments of a cylinder.

In FIGS. 7 and 8 an alternate form of seating member 24' is shown. This member differs from seating member 24 of FIGS. 5 and 6 only in that circumferential ribs 62' are of rectangular cross section rather than segmental cylindrical cross section such as shown in FIGS. 1–6. However, it is to be understood that the outer peripheral portions of ribs 62' bear against the inner surface 65 of housing 11 so as to prevent member 24' from expanding beyond a predetermined diameter, to thereby insure that disc 39 will be seated against the internal surface 60 of seating member 24 at low pressures.

A still further modified form of the present invention is shown in FIG. 9. In this form, a valve seating member 24" is provided which may be identical in all respects to valve seating members 24 and 24' except that it utilizes an annular flexible metal band 66 around the outer surface of the valve seating member to prevent expansion thereof beyond a predetermined diameter. Band 66 is thin so that it is flexible in shape to accommodate the disc 39 in its closed position. However, band 66 will not permit the outer diameter of seating member 24" to expand. In this embodiment the area surrounding the outside of the seating member is a single chamber rather than a plurality of chambers.

Thus it can be seen the ribbed structure 62 and 62' and the flexible metal band 66 will prevent the seating member from expanding beyond a predetermined diameter, and it is this maintaining of dimensions which prevents leakage of the valve at low pressures.

In FIG. 10 a further modified form of the present invention is disclosed wherein the substantially cylindrical seating member 70 does not utilize ribs, such as 62 or 62' of FIGS. 5 and 7, or a flexible band, such as 66 of FIG. 9. Instead, seating member 70 includes an annular rim 71 which is located between the shaft receiving openings and annular flange 49'. Annular rim 71 extends away from annular flange 49' and stops at edge portion 72. The positioning is such that the edge 72 preferably is located in line with the leading face of butterfly valve or disc 39 when the latter is in the closed position. Thus the hydraulic pressure acting in chamber 75 to the left of rim 71 acts on the edge of the disc 39 while the rim 71 tends to prevent the seating member 70 from yielding excessively outwardly. The outer diameter of rim portion 71 is between 0.930 and 0.935 inches. The inner diameter of the housing 11 adjacent rim 71 is between 0.940 and 0.945 inches. Therefore, as can be seen, the maximum clearance between the outer rim 71 and the inner portion of the housing is 0.0075 inches. The minimum clearance is 0.0025 inches. The practical significance of the foregoing is that high pressure liquid can enter the space between the housing and rim 71 to provide pressure. However, because of the close clearance between outer rim 71 and the inside of the housing, rim 71 cannot expand sufficiently to permit leakage because if it expands beyond a predetermined amount, it will abut the inner surface of the housing. In addition, there is an interference fit between the disc 39 and the inside of seating member 70, which will tend to reduce the clearance between rim 71 and the housing. Furthermore, even if the rim 71 and the housing should tend to touch, there will not be enough pressure therebetween to prevent the high pressure liquid from acting radially inwardly on rim 71 to enhance the seating engagement between disc 39 and the inner surface of seating member 70. In other words, the construction shown in FIG. 10 permits the pressure of the liquid to be effective on the ouside of the seating member 70 proximate the outside of the disc 39, and the seating member will not expand excessively under any circumstances because of the low clearance between the outside rim 71 and the inside of the housing. An additional advantage is that because of the clearances, assembly of the seating member 70 into the housing can be effected easily because there will be no binding therebetween. It will also be appreciated, if desired, that rim 71 may be designed so that edge 72 extends slightly to the left of the position shown in the drawings so that a more central portion of the edge of disc 39 is in line with edge 72.

While the foregoing portions of the specification have specifically referred to copper-brazing, it will be understood that any other suitable means of attachment may be used.

It can thus be seen that the improved valve of the present invention is manifestly capable of achieving the above enumerated objectives and while a preferred embodiment has been disclosed, it will be appreciated that it is not limited thereto but may be otherwise embodied within the scope of the following claims.

What is claimed is:

1. A valve comprising a housing having an inner housing surface, a flexible tubular conduit in said housing having an inside surface and an outside surface and having an inlet portion and an outlet portion, butterfly valve means proximate said inside surface for selectively engaging said inside surface, mounting means mounting said butterfly valve means for movement between a closed position in engagement with said inside surface and an open position spaced from said inside surface, chamber means between said outside surface and said housing for receiving pressurized fluid, means for providing pressurized fluid to said chamber means to thereby enhance the seating engagement between said butterfly valve means and said inside surface when said butterfly valve means is in said closed position, and rib means extending circumferentially about said outer surface for providing engagement between said inner housing surface and said flexible tubular conduit substantially at an area opposite to the area of engagement between said butterfly valve means and said inner surface for limiting expansion of said flexible tubular conduit when said butterfly valve means is in engagement with said inner surface in said closed position, said rib means comprising a plurality of ribs on said flexible tubular conduit and wherein said chamber means are located between said ribs.

2. A valve as set forth in claim 1 wherein said ribs are elongated members which extend axially of said flexible tubular conduit and are spaced circumferentially about said flexible tubular conduit.

3. A valve construction comprising a housing having an inner housing surface, a substantially cylindrical flexible seating member in said housing and having an inner surface and an outer surface, inlet and outlet portions on said seating member, first and second spaced apertures in said seating member, a shaft extending through said first and second spaced apertures, a disc mounted on the portion of said shaft between said first and second apertures for movement between a closed position wherein it is in engagement with said inner surface and an open position wherein it is spaced from said inner surface, chamber means between said outer surface and said housing for receiving pressurized fluid, sealing means for effecting a sealing relationship between said outlet portion and said housing whereby said chamber means is in fluid-tight relationship with said seating member at said outlet portion, means in said inlet portion for effecting communication between the inner surface of said inlet portion of said seating member and said chamber means whereby pressurized fluid can enter said chamber means, said chamber means extending beyond said disc toward said outlet portion to thereby provide an inwardly directed force on said outer surface of said tubular member in the area of said outlet portion to force the inner surface of said tubular member into seating engagement with said disc when said disc is in said closed position, and rib means extending circumferentially about said outer surface for providing engagement between said inner housing surface and said flexible tubular conduit substantially at an area opposite to the area of engagement between said disc and said inner surface for limiting expansion of said flexible seating member when said disc is in engagement with said inner surface in said closed position, said rib means comprising a plurality of ribs on said seating member and wherein said chamber means are located between said ribs.

4. A valve as set forth in claim 3 wherein said ribs are elongated members which extend axially of said flexible tubular conduit and are spaced circumferentially about said flexible tubular conduit.

5. A valve comprising a housing having an inner housing surface, a resilient valve seating member having an inner surface and an outer surface in said housing, a butterfly valve having an outer periphery, shaft means for mounting said butterfly valve for movement between a first position wherein said outer periphery of said butterfly valve is in engagement with said inner surface of said cylindrical resilient valve seating member to close said valve and a second position wherein said outer periphery of said butterfly valve is spaced from said inner surface to permit passage of fluid between said butterfly valve and said seating member, chamber means proximate said outer surface for receiving pressurized fluid, limiting means proximate said chamber means for limiting the movement of said seating member away from said butterfly valve when said outer periphery of said butterfly valve is in engagement with said inner surface, said butterfly valve including opening means for receiving said shaft means, and an interference fit between said shaft means and said opening means, said limiting means comprising rib means extending circumferentially about the outside of said seating member for providing effective engagement between said inner housing surface and said outer surface, said rib means comprising a plurality of ribs on said seating member, and said chamber means being located between said ribs.

6. A valve comprising a housing having an inner housing surface, a cylindrical resilient valve seating member having an inner surface and an outer surface in said housing, a butterfly valve having an outer periphery, shaft means for mounting said butterfly valve for movement between a first position wherein said outer periphery of said butterfly valve is in engagement with said inner surface of said cylindrical resilient valve seating member to close said valve and a second position wherein said outer periphery of said butterfly valve is spaced from said inner surface to permit passage of fluid between said butterfly valve and said seating member, a continuous chamber between said outer surface and said inner housing surface for receiving pressurized fluid, a plurality of circumferentially spaced ribs extending about said outer surface completely between said outer surface of said valve seating member and said inner housing surface with said continuous chamber extending between said ribs, said ribs limiting expansion of said valve seating member when said fluid in said chamber is at a relatively low pressure and said butterfly valve means is in engagement with said inner surface in said closed position by providing engagement between said inner housing surface and said outer surface of said valve seating member substantially at an area opposite to the area of engagement between said butterfly valve means and said inner surface, said butterfly valve including opening means for receiving said shaft means, and an interference fit between said shaft means and said opening means.

7. A valve as set forth in claim 6 wherein said limiting means comprises rib means extending circumferentially about the outside of said seating member for providing effective engagement between said inner housing surface and said outer surface.

8. A valve comprising a housing having an inner housing surface, a flexible tubular conduit in said housing having an inside surface and an outside surface and having an inlet portion and an outlet portion, butterfly valve means proximate said inside surface for selectively engaging said inside surface, mounting means mounting said butterfly valve means for movement between a closed position in engagement with said inside surface and an open position spaced from said inside surface, a continuous chamber extending circumferentially between said outside surface and said housing for receiving pressurized fluid, means for providing pressurized fluid at a relatively high pressure to said continuous chamber to thereby enhance the seating engagement between said butterfly valve means and said inside surface when said butterfly valve means is in said closed position, and a plurality of circumferentially spaced ribs extending axially about said outer surface completely between said outer surface of said conduit and said inner housing surface with said continuous chamber extending between said ribs, said ribs limiting expansion of said flexible tubular conduit when said fluid in said chamber is at a relatively low pressure and said butterfly valve means is in engagement with said inner surface in said closed position by providing engagement between said inner housing surface and said outer surface of said flexible tubular conduit substantially at an area opposite to the area of engagement between said butterfly valve means and said inner surface.

9. A valve construction comprising a housing having an inner housing surface, a substantially cylindrical flexible seating member in said housing and having an inner surface and an outer surface, inlet and outlet portions on said seating member, first and second spaced apertures in said seating member, a shaft extending through said first and second spaced apertures, a disc mounted on the portion of said shaft between said first and second apertures for movement between a closed position wherein it is in engagement with said inner surface and an open position wherein it is spaced from said inner surface, a chamber between said outer surface and said inner housing surface for receiving pressurized fluid, sealing means for effecting a sealing relationship between said outlet portion and said housing whereby said housing is in fluid-tight relationship with said seating member at said outlet portion, means in said inlet portion for effecting communication between the inner surface of said inlet portion of said seating member and said chamber whereby pressurized fluid can enter said chamber, said chamber extending beyond said disc toward said outlet portion to thereby provide an inwardly directed force on said outer surface of said tubular member in the area of said outlet portion to force the inner surface of said tubular member into seating engagement with said disc when said disc is in said closed position, and a plurality of circumferentially spaced ribs extending axially about said outer surface completely between said outer surface of said conduit and said inner housing surface for providing engagement between said inner housing surface and said outer surface of said flexible tubular conduit substantially at an area opposite to the area of engagement between said disc and said inner surface for limiting expansion of said flexible seating member when said fluid in said chamber is at a relatively low pressure and when said disc is in engagement with said inner surface in said closed position by providing engagement between said inner housing surface and said outer surface of said flexible tubular conduit substantially at an area opposite to the area of engagement between said disc and said inside surface of said flexible tubular conduit.

* * * * *